(12) United States Patent
Sohn et al.

(10) Patent No.: US 8,652,651 B2
(45) Date of Patent: Feb. 18, 2014

(54) PHOTOLUMINESCENT SHEET

(75) Inventors: Choong-Yong Sohn, Cheongiu-si (KR); Young-Wook Ko, Daejeon (KR)

(73) Assignee: LG Innotek Co., Ltd., Seoul (KR)

( * ) Notice: Subject to any disclaimer, the term of this patent is extended or adjusted under 35 U.S.C. 154(b) by 994 days.

(21) Appl. No.: 11/716,811

(22) Filed: Mar. 12, 2007

(65) Prior Publication Data
US 2007/0221865 A1 Sep. 27, 2007

(30) Foreign Application Priority Data
Mar. 10, 2006 (KR) .................. 10-2006-0022576

(51) Int. Cl.
B32B 9/00 (2006.01)
B32B 19/00 (2006.01)
H05B 33/00 (2006.01)

(52) U.S. Cl.
USPC ....................................... 428/690; 250/484.4

(58) Field of Classification Search
USPC ........................................ 428/690; 250/484.4
See application file for complete search history.

(56) References Cited

U.S. PATENT DOCUMENTS

| | | | |
|---|---|---|---|
| 4,217,380 A | 8/1980 | Medica et al. | |
| 5,883,684 A | 3/1999 | Millikan et al. | |
| 6,011,601 A * | 1/2000 | Kojima | 349/62 |
| 6,064,524 A * | 5/2000 | Oka et al. | 359/582 |
| 6,099,135 A | 8/2000 | Oda et al. | |
| 6,123,431 A | 9/2000 | Teragaki et al. | |
| 6,309,486 B1 | 10/2001 | Kawaguchi et al. | |
| 6,440,587 B1 * | 8/2002 | Jamil et al. | 428/690 |
| 6,906,761 B2 * | 6/2005 | Nakano | 349/65 |
| 7,009,771 B2 * | 3/2006 | Bourdelais et al. | 359/599 |
| 7,052,152 B2 | 5/2006 | Harbers et al. | |
| 2001/0046081 A1 * | 11/2001 | Hayashi et al. | 359/296 |
| 2002/0043627 A1 * | 4/2002 | Bergh | 250/462.1 |
| 2002/0043926 A1 | 4/2002 | Takahashi et al. | |
| 2002/0071948 A1 * | 6/2002 | Duff et al. | 428/323 |
| 2002/0142133 A1 * | 10/2002 | Matsunaga et al. | 428/141 |

(Continued)

FOREIGN PATENT DOCUMENTS

| | | |
|---|---|---|
| JP | 07-174909 | 7/1995 |
| JP | 1998-097201 | 4/1998 |

(Continued)

OTHER PUBLICATIONS

Machine Translation of JP 2002-323613 acquired Jan. 26, 2012.*

(Continued)

*Primary Examiner* — Bruce H Hess
*Assistant Examiner* — Sathavaram I Reddy
(74) *Attorney, Agent, or Firm* — Saliwanchik Lloyd & Eisenschenk

(57) ABSTRACT

A photoluminescent sheet is disclosed. In one embodiment, the photoluminescent sheet includes i) a phosphor, for absorbing some light, of at least one wavelength, of light emitted from a light source and emitting particular light of a wavelength different from the wavelength of the emitted light, ii) a matrix, for having the phosphor, the remaining of the light emitted from the light source penetrating the matrix and iii) a passivation film, for being laminated to at least one surface of the matrix, whereas a roughness is formed on a surface of the passivation film to reduce a contacting area between the photoluminescent sheet and another sheet. According to one embodiment of the present invention, wet is not generated on a screen even though the photoluminescent sheet is connected to other sheets.

35 Claims, 10 Drawing Sheets

(56) References Cited

U.S. PATENT DOCUMENTS

| | | | |
|---|---|---|---|
| 2002/0150722 A1* | 10/2002 | Suzuki | 428/141 |
| 2003/0011315 A1* | 1/2003 | Ito et al. | 315/169.3 |
| 2003/0012008 A1 | 1/2003 | Chang et al. | |
| 2003/0198738 A1* | 10/2003 | Tian | 427/212 |
| 2003/0222577 A1 | 12/2003 | Lu | |
| 2004/0120155 A1* | 6/2004 | Suenaga | 362/362 |
| 2004/0207995 A1 | 10/2004 | Park et al. | |
| 2005/0001225 A1* | 1/2005 | Yoshimura et al. | 257/98 |
| 2005/0001532 A1* | 1/2005 | Srivastava et al. | 313/484 |
| 2005/0196545 A1* | 9/2005 | Ando | 427/446 |
| 2005/0236958 A1* | 10/2005 | Wang et al. | 313/486 |
| 2006/0068154 A1* | 3/2006 | Parce et al. | 428/76 |
| 2007/0031685 A1* | 2/2007 | Ko et al. | 428/447 |

FOREIGN PATENT DOCUMENTS

| | | |
|---|---|---|
| KR | 2000-0059813 | 10/2000 |
| KR | 2002-0068551 | 8/2002 |
| KR | 2005-0051037 | 6/2005 |
| KR | 2005-0093047 | 9/2005 |
| KR | 2005-0107068 | 11/2005 |

OTHER PUBLICATIONS

An Office Action from U.S. Appl. No. 11/298,624 dated May 1, 2008 which is a related case of this application.

* cited by examiner

PHOTOLUMINESCENT SHEET

RELATED APPLICATION

This application relates to U.S. patent application Ser. No. 11/027,119 filed on Dec. 30, 2004, which is incorporated by reference. This application also relates to U.S. patent application Ser. No. 11/716,908, concurrently filed with this application, which is incorporated by reference.

BACKGROUND OF THE INVENTION

1. Field of the Invention

The present invention is related to a photoluminescent sheet, more specifically to a photoluminescent sheet that has a function for wet preventing.

2. Background Art

A photoluminescent sheet (or film), which is included in a back light unit (BLU) used for a liquid crystal display apparatus, performs light diffusion as well as color conversion by using a photoluminescent operation. This sheet is called a photoluminescent film (PLF) because of the performance of the light conversion caused by the photoluminescent operation. Also, this sheet is called a photoluminescent diffusion sheet (PLDS) because of the performance of the light diffusion.

SUMMARY OF CERTAIN INVENTIVE ASPECTS

One aspect of the present invention provides a photoluminescent sheet by which wet is not generated on a screen even though the photoluminescent sheet is connected to other sheets.

Another aspect of the present invention provides a photoluminescent sheet which includes a phosphor, for absorbing some light, of at least one wavelength, of light emitted from a light source and emitting particular light of a wavelength different from the wavelength of the emitted light; a matrix, for having the phosphor, the remaining of the light emitted from the light source penetrating the matrix; and a passivation film, for being laminated to at least one surface of the matrix, whereas a roughness is formed on a surface of the passivation film to reduce a contacting area between the photoluminescent sheet and another sheet.

The passivation film may further include a bead, for minimizing the contacting area between the photoluminescent sheet, and another sheet along with the roughness formed on the surface of the passivation film.

Another aspect of the invention provides a photoluminescent sheet, comprising: i) a main body containing a phosphor and comprising two opposing surfaces wherein the main body is configured to 1) absorb light, of at least one wavelength, emitted from a light source, 2) emit light of a wavelength different from the wavelength of the emitted light and 3) allow the remaining of the light emitted from the light source to penetrate the photoluminescent sheet and ii) a passivation film formed on at least one of the two opposing surfaces of the main body, wherein the passivation film has an uneven surface configured to substantially prevent the main body from contacting an adjacent sheet.

Still another aspect of the invention provides A back light unit, comprising: i) a light source configured to emit light, ii) a photoluminescent sheet containing a plurality of phosphor particles and comprising two opposing surfaces, wherein the photoluminescent sheet is configured to 1) absorb light, of at least one wavelength, emitted from a light source, 2) emit light of a wavelength different from the wavelength of the emitted light and 3) allow the remaining light to pass through the photoluminescent sheet and iii) a passivation film formed on at least one of the two opposing surfaces of the photoluminescent sheet, wherein the passivation film has an uneven surface which contacts neither of the two opposing surfaces of the photoluminescent sheet, wherein the photoluminescent sheet has a first thickness and the passivation film has a second thickness which is substantially less than the first thickness.

BRIEF DESCRIPTION OF THE DRAWINGS

Embodiments of the present invention will be described with regard to the accompanying drawings.

DESCRIPTION OF CERTAIN INVENTIVE EMBODIMENTS

Figure 1:
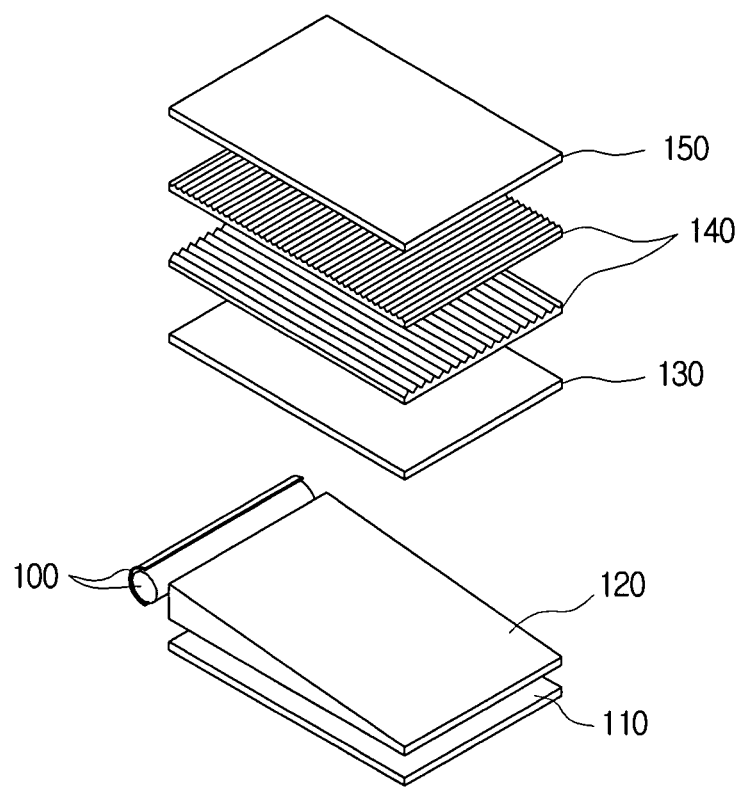
FIG. 1 illustrates a typical back light unit (BLU).

A structure of a back light unit employed for a typical liquid crystal apparatus will be described with reference to FIG. 1. FIG. 1 illustrates a typical back light unit (BLU). As shown in FIG. 1, the BLU used for a liquid crystal display apparatus includes a light source 100, a reflection sheet 110, a light guide sheet 120, a diffusion sheet 130, a prism sheet 140 and a passivation sheet 150.

Light emitted from the light source 100 is transmitted through the light guide sheet 120. As shown in FIG. 1, the light source is disposed at a side of the light guide sheet. The light source 100 can include a reflection plate (not shown) which reflects the light emitted from the light source 100 to the light guide sheet 120 for the improvement of efficiency. The reflection sheet 110 reflects to the light guide sheet 120 again the light, not sent to the light guide sheet 120, among the light that has been emitted from the light source 100 and transmitted to the back of the light guide sheet 120.

The light guide sheet 120 allows light to advance in a particular direction. The diffusion sheet 130 prevents the light, sent from the light guide sheet 120, from being partially gathered by diffusing the light. The prism sheet 140, which is formed by way of a prism having a triangular-column like shape in a regular arrangement on an upper part, gathers the light diffused from the diffusion sheet 130 in a direction vertical to the planar surface of a liquid crystal panel.

The prism sheet 140 is generally provided as horizontal and vertical prism sheets 140 to gather the light, which is passed through the diffusion sheet 130 and has low luminescence due to the horizontal and vertical diffusion to the planar surface of the diffusion sheet 140. The passivation sheet 150, which is provided in a most upper part of the BLU, prevents damage of the below-positioned sheets.

The photoluminescent sheet can replace the diffusion sheet of the structure of the BLU to perform not only the color conversion but also the diffusion of the transmitted light, which has been performed by the diffusion sheet. Accordingly, the photoluminescent sheet is generally provided in the position where the diffusion sheet has been positioned in the structure of BLU. Since the photoluminescent sheet can carry out the functions that the diffusion sheet has performed, a structure for wet preventing of the diffusion sheet will be described with reference to FIG. 2.

Figure 2:
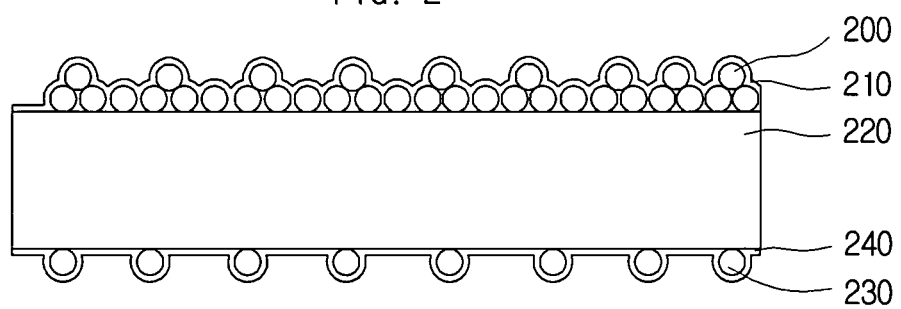
FIG. 2 is a sectional diagram illustrating a section of a typical diffusion sheet for wet preventing.

As illustrated in FIG. 2, the sheet for the wet preventing consists of a diffusion bead 200, a diffusion bead adhesive layer 210, a base film 220, a wet preventing bead 230 and a wet preventing bead adhesive layer 240. What is described as "wet" in this description refers to a phenomenon in which an area of an LCD (or other non self-emissive display) screen appears deteriorated or stained when a sheet is improperly contacted with another sheet or exposed to moisture.

The diffusion sheet 200 diffuses the light transmitted from the light guide sheet 120 to prevent the light from being partially gathered. The diffusion bead 200 is connected to the base film 220 by the diffusion bead adhesive layer 210 in a surface facing the prism sheet 140. The base film 220, which is a base of the diffusion sheet 130, is formed of polyethyleneterephthalate (PET).

In a surface contacting the light guide sheet 120, the wet preventing bead 230 for preventing the wet caused by the contact with the light guide sheet 120 is connected to the base film 120 by the wet preventing bead adhesive layer. This diffusion sheet performs only a function, for preventing the sent light from being partially gathered by diffusing the light. Also, the BLU is difficult to reduce a manufacturing cost or make a compact size. To solve this above problem, there has been developed a photoluminescent sheet, not only for performing the diffusion of transmitted light instead of the diffusion sheet but also for allowing its matrix to have fluorescent materials in order to change colors.

However, in spite of these above benefits, since the photoluminescent sheet cannot perform the different functions together at the first time, the photoluminescent sheet must be connected to other sheets such as the light guide sheet. Accordingly, there has been generated a phenomenon in which an area of an LCD screen appears wet in case that a sheet is improperly contacted with another sheet or exposed to moisture.

Some embodiments of the present invention will be described below with reference to the accompanying drawings, examples of which are illustrated in the accompanying drawings, wherein like reference numerals refer to like elements throughout for the convenience of whole understanding.

Examples of photoluminescent sheets that can have a wet preventing function in accordance with one embodiment of the present invention will be described with reference to FIG. 3 through FIG. 5.

A photoluminescent sheet (or film), which is included in a back light unit (BLU) used for a liquid crystal display apparatus, performs light diffusion as well as color conversion by using a photoluminescent operation.

The photoluminescent sheet includes a phosphor which absorbs some light, of at least one wavelength, of light emitted from the light source, emits particular light of a wavelength different from the wavelength of the emitted light and a matrix which has the phosphor, the remaining of the light emitted from the light source penetrating the matrix.

In one embodiment, the photoluminescent sheet further includes a light diffusing agent for light diffusion.

In one embodiment, the photoluminescent sheet can carry out color conversion by equipping the phosphor in the matrix and can further include the light diffusing agent for performing a light diffusion function, which was performed by a typical diffusion sheet. The photoluminescent sheet, having a wet preventing function, can realize white light from a blue light source by using the photoluminescent operation.

The lighting emitting diode (LED), which is generally used as a light source of BLU, is classified into a blue LED, a white LED and an ultraviolet ray LED depending on a light wavelength.

However, the white LED and the ultraviolet ray LED are restricted to be used due to their more complicated manufacturing process and higher manufacturing cost than the blue LED.

Accordingly, the photoluminescent sheet can include a color conversion function, for realizing white light from the blue LED having benefit in the manufacturing cost and process, and light diffusing function.

The construction of the photoluminescent sheet by which white light is realized from a blue LED used by one embodiment of the present invention will be described.

The matrix is formed of a thermosetting resin. In one embodiment, the matrix can be formed of a silicon resin.

The property of the silicon resin used for the matrix can have the light permeability of about 85 percents or more and the viscosity of about 3000 cps or more. The property of the silicon resin can further be hardened at the temperature of about 150° C. or less.

Also, the preferable property of the silicon can have the stable mixture of the phosphor and the light diffusing agent, the low volatilization, the long pot-life and the good adhesion with the base film.

The silicon resin can be made of a resin having a basic structure of $HO(Me)_2SiO(Me_2SiO)n(Me)_2SiOH$ and $Me_3SiO(MeHSiO)nSiMe_3$ and a small amount of additives of $RSi(OR')n$, $R'=$alkyl or acetyl($=\!\!>\!\!C\!=\!\!OR$) and $R_2Sn(OC\!=\!\!OR')_2$ or a resin a basic structure of $CH_2\!=\!\!CH(Me)_2SiO(Me_2SiO)nSi(Me)_2CH\!=\!\!CH_2$ and $Me_3SiO(MeHSiO)nSi\,Me_3$ and a small amount of additives of $[CH_2\!=\!\!CH(Me)_2SiOSi(Me)_2CH\!=\!\!CH_2]nPt$.

The phosphor performs a photoluminescent operation. The phosphor can be an inorganic phosphor.

The inorganic phosphor can include a phosphor where cerium is doped on a garnet composition material, $Y_3Al_5O_{12}$ (YAG).

More specifically, a yellow phosphor can be one of YAG and TAG composition ($Tb_3Al_5O_{12}$) and Silicate composition ($Sr_2SiO_4$:Eu). The yellow phosphor can be represented by $(Y_{1-x-y}Gd_xCe_y)_3Al_5O_{12}$ (YAG:Gd,Ce), $(Y_{1-x}Ce_x)_3Al_5O_{12}$ (YAG:Ce), $(Y_{1-x}Ce_x)_3(Al_{1-y}Ga_y)_5O_{12}$ (YAG:Ga,Ce), $(Y_{1-x-y}Gd_xCe_y)_3(Al_{5-z}Ga_z)_5O_{12}$(YAG:Gd,Ga,Ce) and $(Gd_{1-x}Ce_x)SC_2Al_3O_{12}$ (GSAG).

The luminescence of $Ce_3+$ depending on the garnet composition can be made with various colors from green (~540 nm; YAG:Ga,Ce) to (~600 nm; YAG:Gd,Ce) without any loss of light efficiency.

A red phosphor for emitting dark red color light can be one of CaS:Eu, SrS:Eu and SrB4O7:Sm. A representative inorganic phosphor can be $SrB_4O_7:Sm_2+$. The $Sm_2+$ is mainly used for a red wavelength.

The dark red inorganic phosphor absorbs whole visible light wavelength range of 600 nm or less and emits the dark red color light of 650 nm or over.

A representative inorganic green phosphor for emitting green color light can be $SrGa_2S4:Eu_2+$. The green inorganic phosphor absorbs light of 500 nm or less and emits light of a main wavelength of 535 nm.

A representative inorganic phosphor for emitting blue color light can be $BaMg_2A_{116}O_{27}:Eu_2+$. The blue inorganic phosphor absorbs light of 430 nm or less and emits light of a main wavelength of 450 nm.

Since too small size of the phosphor causes low photoluminescent efficiency, and too large size causes low light permeability and low uniformity of thin film, the phosphor can have a size of 5 to 30 μm.

The light diffusing agent uniformly scatters light to diffuse the light.

The light diffusing agent can be a polymer compound or an inorganic compound.

The polymer compound can be a transparent organic polymer compound such as an acryl resin, a styrene resin and a silicon resin or a transparent inorganic compound such as synthetic silica, glass bead and diamond.

Also, the inorganic compound can be silicon dioxide ($SiO_2$), titanium (IV) oxide ($TiO_2$), zinc oxide (ZnO), barium sulfate ($BASO_4$), calcium sulfate ($CaSO_4$), magnesium carbonate ($MgCO_3$), aluminum hydroxide ($Al(OH)_3$) or clay. The diffusion of light emitted from the light source is adjusted depending on the size and concentration of the light diffusing agent. The too small size causes low light diffusion efficiency, and the too strong concentration causes low light permeability.

Based on silicon dioxide ($SiO_2$), the light diffusing agent can have the size of 3 to 20 μm and the concentration of 1 to 15%.

In one embodiment, the photoluminescent sheet can further include a hardener and an additive in addition to the phosphor and light diffusing agent.

The hardener can promote the hardening of the matrix, formed of the silicon resin among the thermosetting resins.

The additive can be a material having one or more of a dispersant, which regularly disperses the phosphor to an internal of liquefied silicon resin forming the matrix, a surface-defect resister, which prevents a bubble on a surface of the matrix, and a fluidity composition additive, which adjusts the fluidity of the silicon resin.

The composition of the preferable photoluminescent sheet will be described in case that the photoluminescent sheet having the silicon resin, which forms the matrix, the hardener, the additive and the phosphor is manufactured.

The following tables 1 and 2 show the composition ratio of component materials in the photoluminescent sheet based on the weight of the silicon resin referring to '100' in each case of having the light diffusing agent and no light diffusing agent.

TABLE 1

|  | For strengthening luminance | For strengthening luminance and chromaticity | For strengthening chromaticity |
|---|---|---|---|
| Silicon (weight) | 100 | 100 | 100 |
| Hardener | 0.05~5 | 0.05~5 | 0.05~5 |
| Additive | 0.1~15 | 0.1~15 | 0.1~15 |
| Light diffusing agent | 5~15 | 5~15 | 5~15 |
| Green phosphor | 0 | 1~30 | 1~50 |
| Yellow phosphor | 1~90 | 0.1~60 | 0 |
| Red phosphor | 0 | 1~30 | 1~50 |

TABLE 2

|  | For strengthening luminance | For strengthening luminance and chromaticity | For strengthening chromaticity |
|---|---|---|---|
| Silicon (weight) | 100 | 100 | 100 |
| Hardener | 0.05~5 | 0.05~5 | 0.05~5 |
| Additive | 0.1~15 | 0.1~15 | 0.1~15 |
| Green phosphor | 0 | 1~30 | 1~65 |
| Yellow phosphor | 1~90 | 0.1~60 | 0 |
| Red phosphor | 0 | 1~30 | 1~65 |

As shown in tables 1 and 2, three kinds of photoluminescent sheets can be provided.

Each of 3 kinds of the photoluminescent sheets can be referred to as the photoluminescent sheet for strengthening the luminance, the photoluminescent sheet for strengthening the luminance and chromaticity and the photoluminescent sheet for strengthening the chromaticity.

The photoluminescent sheet for strengthening the luminance uses the yellow phosphor only of the phosphors. Accordingly, if blue light is emitted to the photoluminescent sheet, the light passed through the yellow phosphor has a smooth peak at the wavelength of 550 nm, which is near the wavelength of the yellow light. The blue light that is not passed through the yellow phosphor has a strong peak at 450 nm, which is the wavelength of the blue light. This type of the wavelength has strong luminance.

Since white light must have the proper combination of red, green and blue wavelengths, the photoluminescent sheet for strengthening the luminance may realize the light of low chromaticity.

However, since the blue LED emits generally the light of the luminance that is not high, the photoluminescent sheet for strengthening the luminance can be used to guarantee the luminance of the light passed through the photoluminescent sheet at a maximum.

When adding the light diffusing agent, this photoluminescent sheet for strengthening the luminance can include the hardener of 0.05 to 5, the additive of 0.1 to 15, the light diffusing agent 5 to 15 and the yellow phosphor of 1 to 90 based on the weight of the silicon resin referring to "100" as shown in table 1.

When adding no light diffusing agent, this photoluminescent sheet for strengthening the luminance can include the hardener of 0.05 to 5, the additive of 0.1 to 15 and the yellow phosphor of 1 to 90 based on the weight of the silicon resin referring to "100" as shown in table 2.

The photoluminescent sheet for strengthening the chromaticity realizes white light. Specially, the photoluminescent sheet for strengthening the chromaticity is used for lighting apparatuses. In living interior space, this type of the photoluminescent sheets can be used to reduce the fatigue of eyes.

This photoluminescent sheet for strengthening the chromaticity employs the green and red phosphors of the phosphors.

White color can be realized through the proper combination of the blue, green and red colors. Accordingly, once blue light is emitted to the photoluminescent sheet, the light passed through the red and green phosphors have peaks near to the red and green wavelengths, respectively, and the light passed through no phosphor has a peak near to the blue wavelength. The combination of this red, green and blue light makes the white light.

When adding the light diffusing agent, this photoluminescent sheet for strengthening the chromaticity can include the hardener of 0.05 to 5, the additive of 0.1 to 15, the light diffusing agent 5 to 15, the green phosphor of 1 to 50 and the red phosphor of 1 to 50 based on the weight of the silicon resin referring to "100" as shown in table 1.

When adding no light diffusing agent, this photoluminescent sheet for strengthening the chromaticity can include the hardener of 0.05 to 5, the additive of 0.1 to 15, the green phosphor of 1 to 65 and the yellow phosphor of 1 to 65, based on the weight of the silicon resin referring to "100" as shown in table 2.

The light diffusing agent, this photoluminescent sheet for strengthening the luminance and chromaticity is provided by mixing benefits and disbenefit of the photoluminescent sheet for strengthening the luminance and the photoluminescent sheet for strengthening the chromaticity, respectively.

In other words, the photoluminescent sheet for strengthening the luminance and chromaticity increases the luminance and chromaticity at the same time.

When manufactured with the addition of the light diffusing agent, this photoluminescent sheet for strengthening the luminance and chromaticity can include the hardener of 0.05 to 5, the additive of 0.1 to 15, the light diffusing agent 5 to 15, the green phosphor of 1 to 30, the yellow phosphor of 0.1 to 60 and the red phosphor of 1 to 30 based on the weight of the silicon resin referring to "100" as shown in table 1.

When manufactured with no addition of the light diffusing agent, this photoluminescent sheet for strengthening the luminance and chromaticity can include the hardener of 0.05 to 5, the additive of 0.1 to 15, the green phosphor of 1 to 30, the yellow phosphor of 0.1 to 60 and the yellow phosphor of 1 to 30 based on the weight of the silicon resin referring to "100" as shown in table 2.

The photoluminescent sheet can be a thin film formed by applying the mixture of the phosphor and/or the light diffusing agent to a resin, which is a material of a sheet for performing another function.

The photoluminescent sheet can be formed on the resin that is the material of the sheet for performing another function by various methods such as a screen printing method, a gravure printing method, a knife coating method, a reverse roll coating method, a roll coating method, a calendar coating method, a curtain coating method, an extrusion coating method, a cast coating method, an inverted rod coating method, an engraved-roll coating method, a dip coating method and a slit coating method.

When being directly coated in the light guide sheet, coupled to a photoluminescent diffusion sheet, the photoluminescent diffusion sheet can formed by using the screen printing method.

Examples of the photoluminescent sheet, having the above structures and manufacturing methods, according to one embodiment of the present invention will be described with reference to FIG. 3 through FIG. 5.

Figure 3:
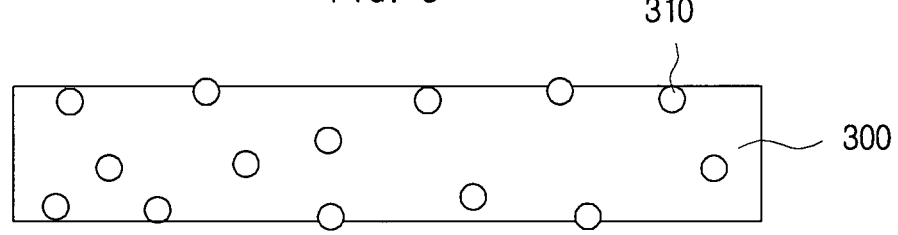
FIG. 3 is a sectional diagram illustrating a section of a first kind of a photoluminescent sheet according to one embodiment of the present invention.
Figure 4:
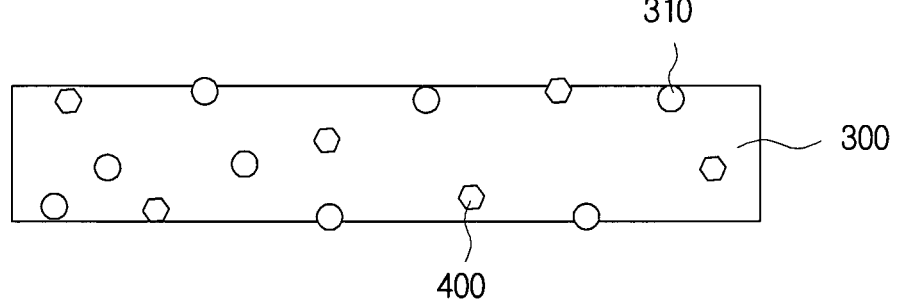
FIG. 4 is a sectional diagram illustrating a section of a second kind of a photoluminescent sheet according to one embodiment of the present invention.

FIG. 3 is a sectional diagram illustrating a section of a first kind of the photoluminescent sheet according to one embodiment of the present invention, and FIG. 4 is a sectional diagram illustrating a section of a second kind of the photoluminescent sheet according to one embodiment of the present invention. FIG. 5 is a sectional diagram illustrating a section of a third kind of the photoluminescent sheet according to one embodiment of the present invention.

FIG. 3 is related to the first kind of the photoluminescent sheet according to one embodiment of the present invention. A matrix 300 has a yellow phosphor 310 only.

FIG. 4 is related to the second kind of the photoluminescent sheet and illustrates the section of the matrix 300 of the photoluminescent sheet, the matrix 300 having the yellow phosphor 310 in FIG. 3 further having a light diffusing agent 400.

The photoluminescent sheet can perform a light diffusing function that was performed by a typical diffusion sheet by having the light diffusing agent 400.

Figure 5:
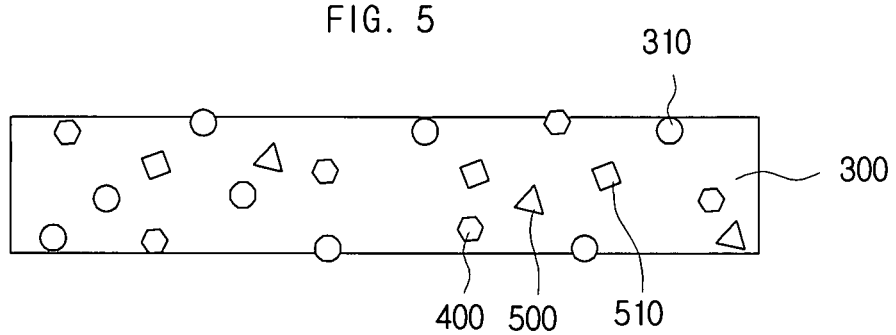
FIG. 5 is a sectional diagram illustrating a section of a third kind of a photoluminescent sheet according to one embodiment of the present invention.

FIG. 5 is related to the third kind of the photo luminescent sheet and illustrates the section of the matrix 300 of the photoluminescent sheet, the matrix 300 further having a red phosphor 500 and a green phosphor 510 as well as the yellow phosphor 310 and the light diffusing agent 400.

In one embodiment, a passivation film can selectively be laminated to the photoluminescent sheet. To avoid an effect of the foreign elements, the passivation film can be laminated by using a silicon resin having an adhesive force after its matrix is hardened.

In addition, the photoluminescent sheet can be directly formed in the light guide sheet of the BLU by the screen printing method.

The photoluminescent sheets illustrated in FIG. 3 through FIG. 5 are examples only. It shall be evident that the present invention can be applied to other photoluminescent sheets, which are not shown in FIG. 3 through FIG. 5.

Hereinafter, a photoluminescent sheet that has a function for wet preventing according to one embodiment of the present invention will be described with reference to a structure and efficiency of the photoluminescent sheet.

Although the photoluminescent sheet that has the function for wet preventing according to one embodiment of the present invention can be embodied with the above-described various kinds of the photoluminescent sheets, executable embodiments will be described by classifying the photoluminescent sheet based on whether to include the light diffusing agent.

Since a passivation film can be laminated to the photoluminescent sheet as described above, at least one embodiment of the present invention performs the wet preventing function by using the passivation film.

Some embodiments of the photoluminescent sheet having the wet preventing function according to one embodiment of the prevent invention will be described below.

Figure 6:
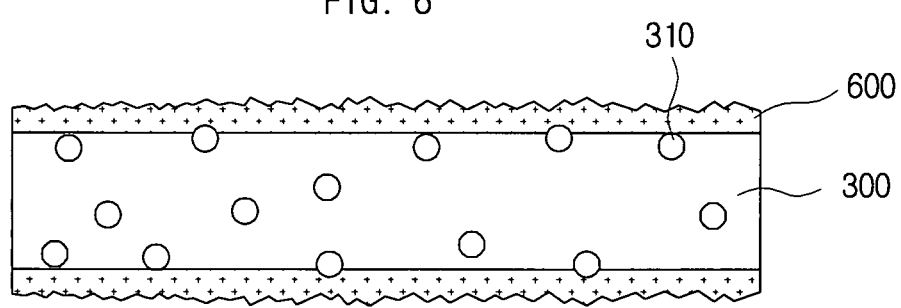
FIG. 6 is a sectional diagram illustrating a section of a photoluminescent sheet in accordance with a first embodiment of the present invention.
Figure 7:
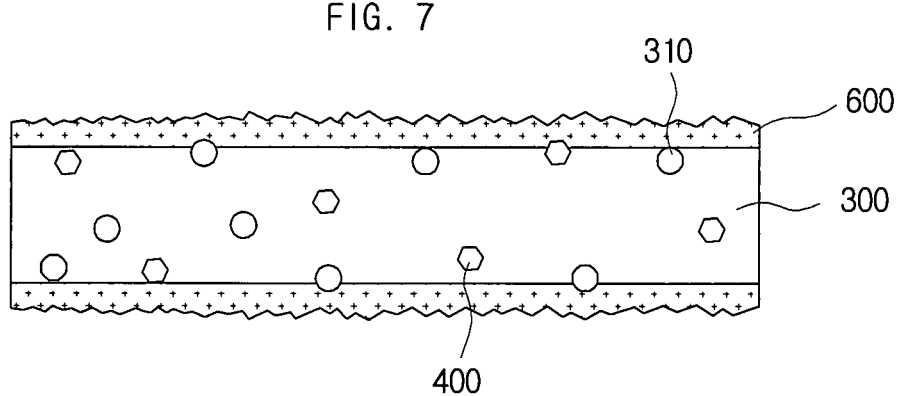
FIG. 7 is a sectional diagram illustrating a section of a photoluminescent sheet in accordance with a second embodiment of the present invention.

Referring FIG. 6 and FIG. 7, the photoluminescent sheet performs the wet preventing function by forming a rough surface of the passivation film that can be laminated to the photoluminescent sheet.

FIG. 6 is a sectional diagram illustrating the section of the photoluminescent sheet in accordance with a first embodiment of the present invention.

As shown in FIG. 6, the photoluminescent sheet in accordance with the first embodiment of the present invention can include a passivation film 600, a matrix 300 and a phosphor 310. The surface of the passivation film 600 is roughly formed.

In case that the photoluminescent sheet is coupled to the other sheets, the roughness of the passivation film 600 provides the wet preventing function by reducing, or by minimizing, a contacting area between the sheets.

As described above, the passivation film 600, which is laminated to the photoluminescent sheet, can be formed of colorless transparent synthetic resin having the high light permeability.

More specifically, the passivation film 600 can be formed of polyethylene terephthalate (PET), polyethylene naphthalene, an acrylic resin, polycarbonate and polystyrene for example.

For outgoing transparency and high strength and bending, the passivation film 600 can be formed of PET.

For heat-resisting and anti-chemical properties, the passivation film 600 can be formed of polycarbonate.

As described above, the passivation film 600, which protects the photoluminescent sheet, can have enough depth to protect the photoluminescent sheet against dust, moisture and other foreign elements without any affects to the light permeability and other optical factors.

The passivation film 600 can have the depth of 10~50 μm for protecting and preventing pollution.

The passivation film 600 having this structure and functions is formed with the rough surface for minimizing the contacting area between the sheets in order to perform the wet preventing function.

Also, this rough surface of the passivation film 600 can diffuse light by diffusedly reflecting the light of the wavelength, converted through the photoluminescent sheet, thereon.

To promote the light diffusion, as shown in FIG. 7, the photoluminescent sheet can further have a light diffusing agent.

FIG. 7 is a sectional diagram illustrating a section of the photoluminescent sheet in accordance with a second embodiment of the present invention in case that the photoluminescent sheet further has a light diffusing agent 400 for diffusing light in addition to having the phosphor for the photoluminescent operation.

Figure 8:
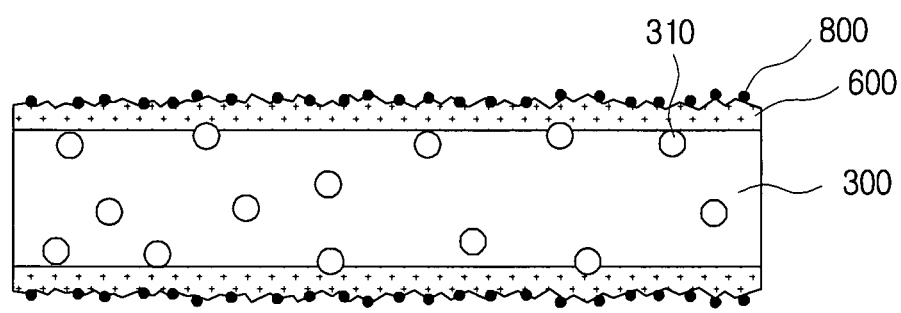
FIG. 8 is a sectional diagram illustrating a section of a photoluminescent sheet in accordance with a third embodiment of the present invention.
Figure 9:
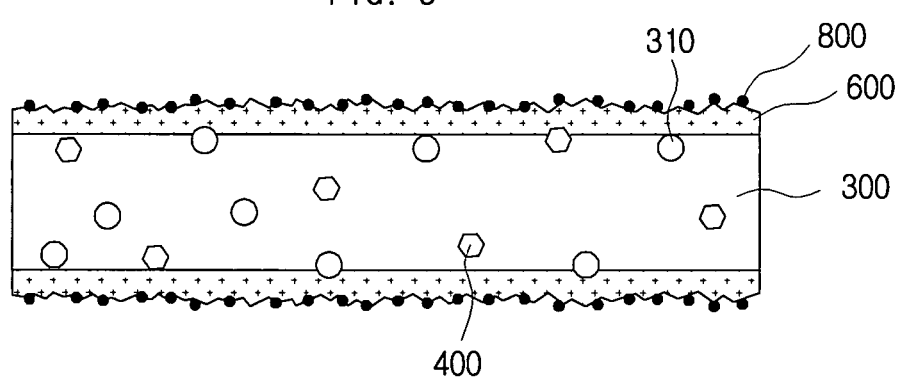
FIG. 9 is a sectional diagram illustrating a section of a photoluminescent sheet in accordance with a fourth embodiment of the present invention.

FIG. 8 and FIG. 9 show that a bead 800 is further included in the passivation film 600 in addition to forming the rough surface on the passivation film 600, which is laminated to the surface of the photoluminescent sheet.

FIG. 8 is a sectional diagram illustrating a section of the photoluminescent sheet in accordance with a third embodiment of the present invention. As shown in FIG. 8, the photoluminescent sheet in accordance with the third embodiment of the present invention minimizes the contacting area between the sheets thanks to the rough surface and the bead 800 by including the passivation film 600 having the rough surface and further having the bead 800.

For the bead 800 that is a wet preventing bead, the same kind of the bead as generally used can be employed. The bead 800 can have a sphere shape, formed of a transparent inorganic material or a polymer resin.

The transparent inorganic material can be one of $SiO_2$ and $TiO_2$. The polymer resin can be one of polymethylmethacrylate (PMMA), polystyrene (PS) and polycarbonate (PC). Also, the bead 800 can be formed of the same material as the light diffusing agent 400 included in the photoluminescent sheet. In this case, even if the photoluminescent sheet has no light diffusing agent 400, the bead 800 attached on the passivation film can diffuse the light that is excited in the photoluminescent sheet and penetrates the photoluminescent sheet.

The bead 800 can have sphere shapes of various sizes. Generally, the size of 1 to 90 μm is commonly used. The size can be 3 to 30 μm.

The bead 800 is included in the aforementioned passivation 600 to be attached on the photoluminescent sheet.

As described above, the light diffusing agent 400 can be included along with the bead in the passivation film 600 or inside of the matrix.

FIG. 9 is a sectional diagram illustrating a section of the photoluminescent sheet in accordance with a fourth embodiment of the present invention in case that the light diffusing agent 400 for diffusing light as well as the phosphor for the photoluminescent operation are further included in the photoluminescent sheet.

Figure 10:
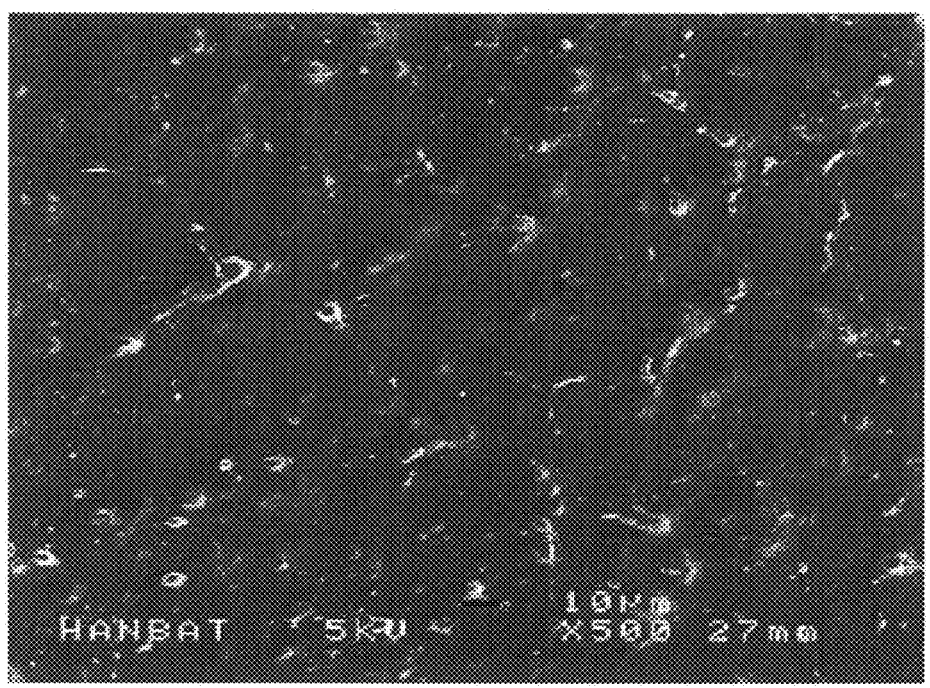
FIG. 10 is an enlarged diagram illustrating a surface of a photoluminescent sheet having a really embodied wet preventing function in accordance with the first embodiment of the present invention.

Hereinafter, a case that the photoluminescent sheet really embodies the wet preventing function by forming the rough surface on the passivation film of the photoluminescent sheet will be described. FIG. 10 is an enlarged diagram illustrating a surface of the photoluminescent sheet having the real embodied wet preventing function in accordance with the first embodiment of the present invention.

As shown in FIG. 10, the pointing line represented in a lower part of FIG. 10 points to a rough surface formed by the line generated between the beads.

The line generated between the beads has a size of 10 nm*500 and forms the rough surface in units of micrometer.

Although the minute rough surface is formed in units of micrometer, when the sheets are coupled to each other, the contacting area between the sheets can be minimized thanks to the minute rough surface formed by the beads in units of micrometer, to thereby be capable of realizing the wet preventing function.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

What is claimed is:

1. A photoluminescent sheet, comprising:
    a body comprising a phosphor emitting yellow color light and comprising two opposing surfaces, wherein the body is configured to 1) absorb light, of a wavelength, emitted from a light source, and 2) convert some of the light emitted from the light source to light of a wavelength range different from the wavelength of the light emitted from the light source;
    a passivation film on at least one of the two opposing surfaces of the body, wherein the passivation film has an uneven surface; and
    a plurality of beads on the uneven surface of the passivation film.

2. The photoluminescent sheet of claim 1, wherein the beads are formed of a transparent inorganic material or a polymer resin, and wherein each of the beads has a diameter between about 3 μm and about 30 μm.

3. The photoluminescent sheet of claim 2, wherein the transparent inorganic material is silicon dioxide ($SiO_2$) or titanium (IV) oxide ($TiO_2$).

4. The photoluminescent sheet of claim 2, wherein the polymer resin is polymethylmethacrylate (PMMA), polystyrene (PS), or polycarbonate (PC).

5. The photoluminescent sheet of claim 1, wherein the passivation film is formed of a colorless transparent synthetic resin.

6. The photoluminescent sheet of claim 5, wherein the colorless transparent synthetic resin is polyethylene terephthalate (PET), polyethylene naphthalene, an acrylic resin, polycarbonate, or polystyrene.

7. The photoluminescent sheet of claim 1, wherein the passivation film has a thickness between about 10 μm and 50 μm.

8. The photoluminescent sheet of claim 1, wherein the body further comprises a light diffusing agent, wherein the light diffusing agent is formed of a polymer compound or an inorganic compound.

9. The photoluminescent sheet of claim 8, wherein the polymer compound is an acrylic resin, an epoxy resin, a styrene resin, a silicon resin, synthetic silica, glass bead, or diamond.

10. The photoluminescent sheet of claim 8, wherein the inorganic compound is silicon dioxide ($SiO_2$), titanium (IV) oxide ($TiO_2$), zinc oxide (ZnO), barium sulfate ($BASO_4$), calcium sulfate ($CaSO_4$), magnesium carbonate ($MgCO_3$), or aluminum hydroxide ($Al(OH)_3$).

11. The photoluminescent sheet of claim 8, wherein the light diffusing agent comprises a plurality of spherically shaped particles, and wherein each of the particles has a diameter between about 3 μm and 20 μm.

12. The photoluminescent sheet of claim 8, wherein the light diffusing agent has the concentration of about 1% to 15% with respect to the entire components of the main body.

13. The photoluminescent sheet of claim 1, wherein the phosphor emitting yellow light is $Y_3Al_5O_{12}$ (YAG) and TAG composition ($Tb_3Al_5O_{12}$), or silicate composition ($Sr_2SiO_4$:Eu).

14. The photoluminescent sheet of claim 1, wherein the phosphor comprises a plurality of phosphor particles, and wherein each of the phosphor particles has a size between about 5 μm and 30 μm.

15. The photoluminescent sheet of claim 1, wherein the body is formed of a thermosetting resin.

16. The photoluminescent sheet of claim 15, wherein the thermosetting resin has the light permeability of about 85 percent or more.

17. A back light unit, comprising:
a light source configured to emit light of a first wavelength range and comprising a light emitting diode;
a light guide sheet adjacent to the light source;
a photoluminescent sheet comprising a phosphor and comprising two opposing surfaces, wherein the photoluminescent sheet is disposed on the light guide sheet, and wherein the photoluminescent sheet is configured to convert some of the light emitted from the light source to light of a different color in a second wavelength range;
a passivation film formed on at least one of the two opposing surfaces of the photoluminescent sheet, wherein the passivation film has an uneven surface which contacts neither of the two opposing surfaces of the photoluminescent sheet; and
a plurality of beads formed on the uneven surface of the passivation film.

18. The back light unit of claim 17, wherein the passivation film is configured to prevent the photoluminescent sheet from contacting an adjacent sheet.

19. The back light unit of claim 17, wherein the back light unit is incorporated into a liquid crystal display.

20. The back light unit of claim 17, wherein the light source is disposed along an edge of the light guide sheet.

21. A back light unit, comprising:
a light source configured to emit light of a first wavelength range and comprising at least one of a blue light emitting diode, an ultraviolet ray light emitting diode, or a white light emitting diode;
a light guide sheet adjacent to the light source;
a photoluminescent sheet comprising a phosphor for emitting yellow color light and comprising two opposing surfaces, wherein the photoluminescent sheet is disposed on the light guide sheet, and wherein the photoluminescent sheet is configured to convert some of the light emitted from the light source to light of a second wavelength range different from the first wavelength range;
a passivation film on at least one of the two opposing surfaces of the photoluminescent sheet, wherein the passivation film has an uneven surface; and
a plurality of beads on the uneven surface of the passivation film,
wherein a remaining light emitted from the light source is combined with the converted light to produce a white light.

22. The back light unit of claim 21, wherein the light source is disposed along an edge of the light guide sheet.

23. The back light unit of claim 21, wherein the light source is the blue light emitting diode and the converted light has a yellow color.

24. The back light unit of claim 21, wherein the phosphor further comprises at least one of a phosphor for emitting red color light and a phosphor for emitting green color light.

25. A back light unit, comprising:
a light source configured to emit light of a first wavelength range and comprising at least one light emitting diode;
a light guide sheet adjacent to the light source;
a photoluminescent sheet comprising a plurality of phosphor and comprising two opposing surfaces, wherein the photoluminescent sheet is disposed on the light guide sheet, and wherein the photoluminescent sheet is configured to convert some of the light emitted from the light source to light of a second wavelength range different from the first wavelength range;
a passivation film on at least one of the two opposing surfaces of the photoluminescent sheet, wherein the passivation film has an uneven surface; and
a plurality of beads on the uneven surface of the passivation film,
wherein a remaining light emitted from the light source is combined with the converted light to produce a mixed light.

26. The back light unit of claim 25, wherein the light source is disposed along an edge of the light guide sheet.

27. The back light unit of claim 25, wherein the light source is a blue light emitting diode and the plurality of phosphors comprises at least two phosphors for emitting at least two of a red color light, a green color light, or a yellow color light.

28. The back light unit of claim 25, wherein the mixed light is white light.

29. A back light unit, comprising:
a light source configured to emit light of a first wavelength range and comprising at least one light emitting diode;
a light guide sheet adjacent to the light source;
a photoluminescent sheet comprising at least one phosphor for emitting a plurality of color lights and comprising two opposing surfaces, wherein the photoluminescent sheet is configured to convert some of the light emitted from the light source to light of a second wavelength range different from the first wavelength range;

a passivation film on at least one of the two opposing surfaces of the photoluminescent sheet, wherein the passivation film has an uneven surface; and a plurality of beads on the uneven surface of the passivation film, wherein the remaining light emitted from the light source is combined with the converted light to produce a white light.

30. The back light unit of claim 29, wherein the light source is disposed along an edge of the light guide sheet.

31. The back light unit of claim 29, wherein the light of the second wavelength range comprises at least one of red color light, green color light, or blue color light.

32. The photoluminescent sheet of claim 1, wherein the body further comprises a light diffusing agent, wherein particles of the light diffusing agent are dispersed within the body.

33. The photoluminescent sheet of claim 8, wherein particles of the light diffusing agent are dispersed within the body.

34. The photoluminescent sheet of claim 1, wherein particles of the phosphor are dispersed within the body.

35. The photoluminescent sheet of claim 8, wherein particles of the phosphor are dispersed within the body.

* * * * *